Oct. 23, 1928.

W. J. PACKER

BOTTLE CAP PIERCER

Filed March 29, 1927

1,689,047

INVENTOR
*Warren J. Packer*
BY
*H. G. Manning*
ATTORNEY

Patented Oct. 23, 1928.

UNITED STATES PATENT OFFICE.

WARREN J. PACKER, OF MERIDEN, CONNECTICUT.

BOTTLE-CAP PIERCER.

Application filed March 29, 1927. Serial No. 179,343.

This invention relates to perforating devices, and more particularly to a device for piercing a hole in a milk bottle cap so as to permit the milk to be withdrawn through a straw without removal of the cap from the bottle.

One object of this invention is to provide a bottle cap perforator which will be simple in construction, inexpensive to manufacture, easy to install and manipulate, compact, ornamental in appearance, and very efficient and durable in use.

With these and other objects in view there has been illustrated on the accompanying drawings one form in which the invention may be conveniently embodied in practice.

Figure 1:
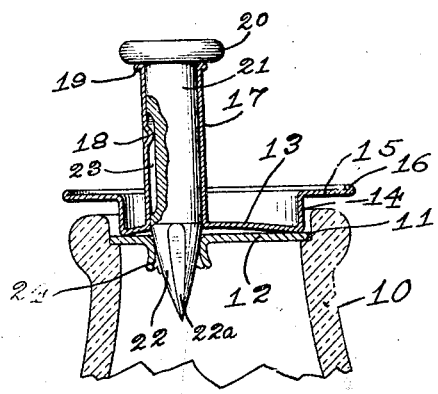
Fig. 1 represents a sectional view of the top of a milk bottle with the cap perforator in operating position.
Figure 2:
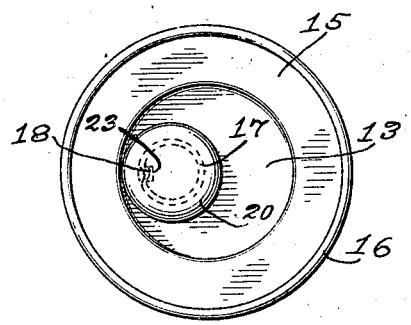
Fig. 2 is a top view of the cap perforator.

The present invention is especially adapted for use in schools where milk is furnished to the pupils during school hours. In the past, in order to gain access to the contents of the milk bottles, it has been customary for teachers in serving milk to the school children either to remove the cap altogether with their fingers or to punch a hole in the cap with a pencil or other similar implement. These methods were unsanitary owing to the fact that the milk was likely to become contaminated with disease germs.

By means of the present invention, the above and other disadvantages have been avoided. This has been accomplished by providing a cap perforating device which will permit access to the milk in a sanitary manner, and which will prevent any possibility of contamination of the milk by the fingers or pencils of the pupils.

Referring now to the drawings in which like reference numerals denote corresponding parts throughout the several views, the numeral 10 indicates the neck of a bottle within which is a shoulder 11 for receiving a cap 12 of the usual nature.

The cap perforating device comprises a base member 13 which is made slightly concave so that it will be supported on the cap 12 along its outer edge above the shoulder 11. At the edge of the base member 13, provision is made of an upwardly extending ring member 14 which terminates in an outwardly extending flange 15 which has its periphery 16 bent inwardly upon itself to form a smooth bead. The ring 14 and flange 15 are adapted to cover the neck of the bottle and said flange 15 forms a hand gripping portion to steady the device while in use.

Mounted eccentrically within the ring member 14 and extending upwardly from the concave base 13 is a tubular member 17 preferably cylindrical in shape. The tubular member 17 has a depressed lug 18 intermediate its length and is provided with an enlarged bead 19 at its upper end, said bead 19 serving as a seat for a rounded handle member 20 of a plunger member 21 preferably constructed of solid stock.

As clearly shown in Fig. 1, the plunger member 21 is made cylindrical and is mounted to slide loosely within the tubular member 17. The bottom portion of the plunger 21 is provided with a conical piercing member 22, said piercing member having a plurality of flat sides 22$^a$ to cause the perforation produced in the cap 12 by the plunger 21 to be polygonal in shape, and to render the piercing operation easier of accomplishment. The plunger 21 is provided with a slot or channel 23 which is adapted to receive the depressed lug 18 previously mentioned. The lug 18 is forced into said channel 23 after the plunger has been assembled within the tubular member 17 and serves to prevent relative rotation between said plunger and said tubular member.

Figure 3:
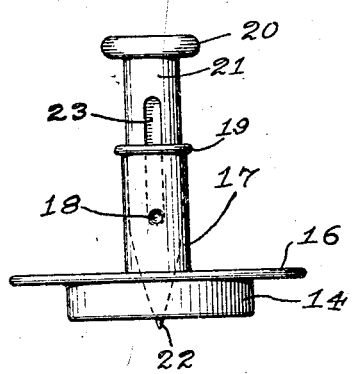
Fig. 3 is a side view of the same.
Figure 4:
Fig. 4 is a cross-sectional view of the bottom portion of the perforating plunger.

In operation, when it is desired to use the device, the teacher or other person in authority will grasp the flange 15 and place the base member 13 within the neck 10 of the milk bottle allowing it to rest upon the cap 12 thereof. By pressing with her thumb, the plunger will be forced downwardly from the position shown in Fig. 3 to that in Fig. 1, making a neat perforation in the milk bottle cap 12. The pupil may then obtain a drink of milk merely by inserting a straw through the perforation 24. It will be understood that the teacher will ordinarily perforate the caps of the milk bottles of all of the pupils in her class, thus avoiding the unsanitary methods formerly employed.

One advantage of this invention is that since it is unnecessary to remove the caps from the bottles, the caps will not require extracting wires or tabs which are likely to interfere with the operation of the bottling and capping machines.

A further advantage is that by locating the tubular member 17 eccentrically within the ring member 14, the perforation can be made nearer the edge of the bottle cap, thus permitting the straw to be brought near the child, and facilitating drinking the milk from the bottle.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a device for piercing a hole in a milk bottle cap, a base shaped to fit upon the cap within the neck of said bottle, and a pointed plunger slidably carried by said base for penetrating said cap, said base having a laterally extending flange to fit over the edge of said bottle.

2. In a device for producing an aperture in a milk bottle cap so that the contents may be withdrawn through a straw without removing the cap, a tubular base member shaped to fit on the cap within the neck of the bottle, and a plunger slidable in said base member for penetrating said cap, said base member having an upwardly extending rim.

3. In a device for producing an aperture in a milk bottle cap so that the contents may be withdrawn through a straw without removing the cap, a tubular base member shaped to fit on the cap within the neck of the bottle, and a plunger non-rotatively mounted in said base member adapted to slide vertically downward to penetrate said cap, said base member having a hand-gripping flange extending therefrom.

4. In a device for piercing a hole in a milk bottle cap, a base adapted to rest upon the cap, and a pointed plunger slidably carried by said base for penetrating said cap, said base having an upwardly extending vertical rim and an outwardly extending flange to fit over the top of the bottle.

5. In a device for producing an aperture in a milk bottle cap so that the contents may be withdrawn through a straw without removing the cap, a tubular base member shaped to rest on the cap within the neck of the bottle, said base member having an inwardly extending guiding lug, and a plunger slidable in said base member for penetrating said cap, said plunger having a longitudinal groove to fit about said guiding lug to prevent rotation of said plunger in said base member.

6. In a device for perforating a milk bottle cap, a base shaped to fit upon said cap within the neck of the bottle, a tube extending up from said base and eccentrically mounted thereon, and a plunger vertically slidable within said tube for piercing said cap.

7. In a device for perforating a milk bottle cap, a cupped base adapted to be located within the bottle neck and shaped to fit upon the entire rim of the cap, a tube extending upwardly from said base, and a plunger slidable within said tube, said plunger having its lower end pointed for piercing said cap.

8. In a device for perforating a milk bottle cap, a cupped base adapted to be located within the bottle neck and shaped to fit upon the entire rim of said cap, a tube extending upwardly from said base, a plunger slidable within said tube, said plunger having its lower end pointed for piercing said cap, and the pointed end of said plunger having flat faces to produce a polygonal shaped perforation in said cap.

9. In a device for perforating a milk bottle cap, a cupped base adapted to be located within the bottle neck and to rest upon the cap, a tube extending upwardly from said base, and a plunger slidable within said tube, said plunger having its lower end pointed for piercing said cap, said tube being mounted eccentrically within said base.

10. In a device for perforating a milk bottle cap, a cupped concave base adapted to be located within the bottle neck and shaped to rest upon the entire rim of said cap, a tube extending upwardly from said base, and a plunger slidable within said tube, said plunger having its lower end pointed for piercing said cap.

In testimony whereof, I have affixed my signature to this specification.

WARREN J. PACKER.